United States Patent [19]

Boettner

[11] Patent Number: 4,994,099
[45] Date of Patent: Feb. 19, 1991

[54] METHOD FOR FINING MOLTEN GLASS

[75] Inventor: George B. Boettner, Corning, N.Y.

[73] Assignee: Corning Glass Works, Corning, N.Y.

[21] Appl. No.: 467,251

[22] Filed: Jan. 19, 1990

Related U.S. Application Data

[62] Division of Ser. No. 339,605, Apr. 17, 1989, Pat. No. 4,906,272.

[51] Int. Cl.⁵ .......................... C03B 5/225; C03B 5/23
[52] U.S. Cl. ........................................ 65/136; 65/137
[58] Field of Search ................................ 65/136, 137

[56] References Cited

U.S. PATENT DOCUMENTS

| | | | |
|---|---|---|---|
| 2,936,549 | 5/1960 | Stinnes et al. | 65/341 |
| 3,420,653 | 1/1969 | Boettner | 65/335 |
| 3,457,059 | 7/1969 | Boettner | 65/347 |
| 4,004,902 | 1/1977 | Pieper | 65/136 |
| 4,029,887 | 6/1977 | Spremulli | 65/326 |
| 4,184,863 | 1/1980 | Pieper | 65/135 |
| 4,584,007 | 4/1986 | Kurata | 65/337 |
| 4,726,831 | 2/1988 | Fogle et al. | 65/136 |

OTHER PUBLICATIONS

Abstract 88-336253/47 for Russian Patent Application Ser. No. SU 1393-805-A, published May 7, 1988.
Abstract 88-336254/47 for Russian Patent Application Ser. No. SU 1393-806-A, published May 7, 1988.

Primary Examiner—Joye L. Woodard
Attorney, Agent, or Firm—M. M. Klee; A. L. Michaelsen

[57] ABSTRACT

A furnace for fining molten glass is provided in which glass flows in a substantially vertical direction prior to exiting the furnace. As it flows vertically, the glass is allowed to cool. This cooling, in turn, allows the glass to be removed from the furnace through a narrow passageway without producing excessive wear of the passageway. Preferably, vertical flow of the molten glass at the exit end of the furnace is produced across the furnace's full width. In this way, the molten glass does not stagnate within the furnace and undesirable scums on the top surface of the glass are avoided. In certain preferred embodiments, the vertical flow is achieved by a trough which has sloped sides and which connects with and extends downward from the bottom surface of the furnace.

6 Claims, 4 Drawing Sheets

METHOD FOR FINING MOLTEN GLASS

CROSS-REFERENCE TO RELATED APPLICATIONS

This application is a divisional application of copending application Ser. No. 07/339,605, filed on Apr. 17, 1989, now U.S. Pat. No. 4,906,272.

BACKGROUND OF THE INVENTION

1. Field of the Invention

This invention relates to glass melting furnaces and, in particular, to an improved furnace for fining molten glass.

2. Description of the Prior Art

As is known in the art, the preparation of molten glass from which glass articles can be made involves three basic steps: 1) the melting of raw materials to produce a molten glass which contains a few solid inclusions and, in the typical case, numerous bubbles: 2) the fining of the molten glass to remove the bubbles and to completely dissolve any remaining solids: and 3) the distributing of the molten glass to appropriate forming equipment to produce the desired glass articles.

A variety of strategies and furnace configurations have been proposed over the years for performing the melting and fining operations. See, for example, Boettner, U.S. Pat. No. 3,457,059, Pieper, U.S. Pat. No. 4,184,863, and Kurata, U.S. Pat. No. 4,584,007. Of particular relevance to the present invention is the furnace disclosed in Boettner, U.S. Pat. No. 3,420,653 (the "'653 patent"), the relevant portions of which are incorporated herein by reference.

The furnace disclosed in the '653 patent employed: (1) a relative deep melting zone 13, (2) a relatively shallow fining zone 15, and (3) a distribution zone consisting of cooling channel 29 and distributor 27 (see FIG. 3 of the '653 patent). The melting and fining zones were separated by bridgewall 17 which included multiple throats 19. The withdrawal (exit) end of the fining zone included inwardly angled walls so as to make the width of the fining zone equal to the width of channel 29 at the fining zone's exit.

As described in the '653 patent, raw materials were introduced into melting zone 13 through charging inlets 23. The materials were melted in that zone, and the resulting molten glass flowed from the melting zone to fining zone 15 through throats 19. In the finer, bubbles were removed from the molten glass. The width/depth ratio of the finer was preferably made greater than 10:1 so as to produce a nearly uniform horizontal flow front or velocity profile in the finer. To exit the finer, the molten glass flowed inward towards channel 29. Once in channel 29, the molten glass flowed into distributor 27 which then distributed the molten glass to one or more forming machines.

The furnace design disclosed in the '653 patent provided a fundamentally sound approach for melting and fining molten glass. In one area, however, this furnace had a number of drawbacks. That area was at the withdrawal end of the finer. In this area, the molten glass converged from a wide zone, e.g., 10–20 feet, to a narrow throat, e.g., about two feet. As a result, the forward corners of the zone were subject to stagnation. This stagnation, in turn, permitted a scum to form which could periodically break off and create a defect in the glass.

In addition to the stagnation problem, the withdrawal system disclosed in the '653 patent was subject to the problem that excessively hot molten glass was confined to flow through a narrow throat. As a result, the throat would be subject to accelerated wear, which, in turn, would shorten the useful life of the furnace.

SUMMARY OF THE INVENTION

In view of the foregoing state of the art, it is an object of the present invention to provide an improved glass melting furnace. More specifically, it is an object of the invention to improve the fining zone of such a furnace. In particular, it is an object of the invention to provide a finer having an improved withdrawal zone which (1) is less likely to create areas of stagnant molten glass within the finer, and (2) is less likely to be subject to rapid wear as a result of excessively hot glass converging into a narrow passageway as it exits the finer.

To achieve the foregoing and other objects, the invention provides a furnace which causes molten glass to flow in a substantially vertical direction just prior to exiting the furnace. As it flows vertically, the glass is allowed to cool. This cooler glass can then be passed through a narrow passageway without producing excessive wear of the passageway. Preferably, vertical flow of the molten glass at the exit end of the furnace is produced across the furnace's full width. In this way, the molten glass does not stagnate within the furnace and thus undesirable scums are not produced.

In certain preferred embodiments, the vertical flow is produced by means of a trough which connects with and extends downward from the bottom surface of the furnace. When such a trough is used, it is further preferred to slope the side walls of the trough so as to cause the molten glass to move towards the center of the trough as it moves downward. The molten glass cools as it passes through the trough, and thus a narrow passageway, e.g., a circular pipe, can be used to remove the converging glass from the center of the trough. Because of the differences in temperature between the molten glass at the center and sides of the trough, convective currents are set up within the glass as it passes through the trough. These currents help keep the glass from stagnating at the surface of the trough and thus help prevent the formation of a scum at the exit end of the furnace.

The accompanying drawings, which are incorporated in and constitute part of the specification, illustrate the preferred embodiments of the invention, and together with the description, serve to explain the principles of the invention.

DESCRIPTION OF THE PREFERRED EMBODIMENTS

Figure 1:
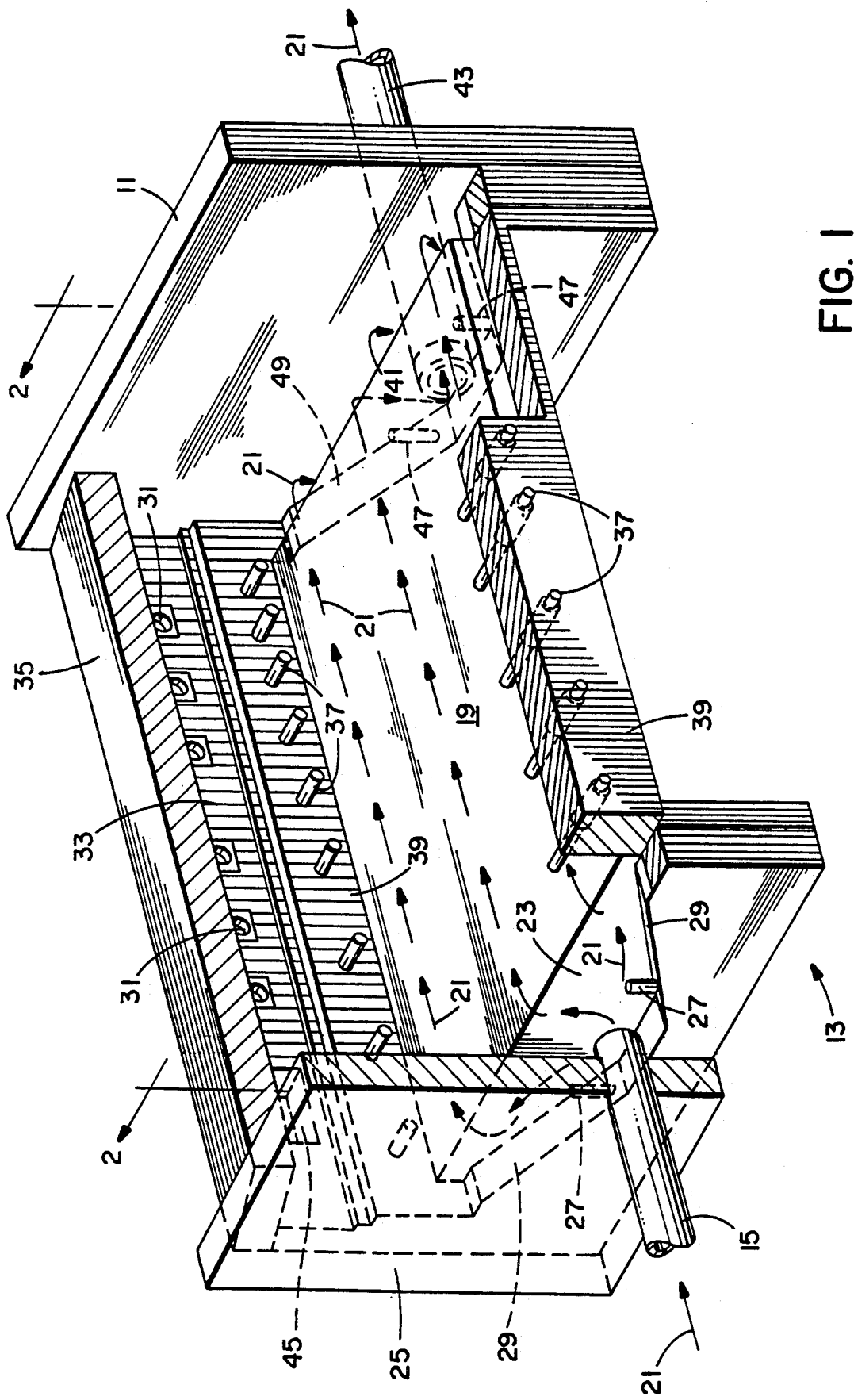
FIG. 1 is a perspective view, partially in section, showing a finer constructed in accordance with the principles of the present invention having an exit trough with slanted (sloped) sides and a single glass withdrawal port at the center of the trough.

With reference now to the drawings, wherein like reference characters designate like or corresponding parts throughout the several views, there is shown in FIG. 1 a finer 13 constructed in accordance with the present invention. Finer 13 includes front wall 11 at its outlet end, back wall 25 at its inlet end, crown 35, breastwalls 33, sidewalls 39, bottom surface 19, inlet slot 23, and exit trough 41 defined by front wall 11 and ledge 53 at the outlet end of bottom surface 19.

The finer receives molten glass from a premelter (not shown) by means of pipe 15, e.g., a molybdenum pipe (see Spremulli, U.S. Pat. No. 4,029,887). The premelter serves the functions of 1) dissolving raw materials, and 2) homogenizing (mixing) the molten glass so that it enters the finer with uniform properties and a low level of solid inclusions, but typically with a high level of bubbles. Various constructions known in the art can be used for the premelter.

In general, the connection between the premelter and the finer should be chosen so that the thermal profile in the finer is essentially independent of thermal changes in the premelter.

The finer serves the functions of (1) removing bubbles from the molten glass and (2) completing the dissolution of any solids not fully dissolved in the premelter. These functions are accomplished by subjecting the molten glass to a time-temperature profile as it passes over the finer's bottom surface 19, i.e., as it passes through the finer's processing zone. The time-temperature profile is selected based on the particular type of glass being processed.

Preferably, as taught in the '653 patent, the distance between glass line 17 and bottom surface 19 (i.e., the depth of the glass in the processing zone) is kept shallow, e.g., the depth is set to be approximately 10% of the finer's width, so that significant convection currents do not develop in the molten glass as it passes over the bottom surface. In this way, the time-temperature profile to which the glass is exposed as it passes through the finer can be accurately controlled. When a shallow bed is used, the molten glass flows across bottom surface 19 with a substantially parabolic velocity profile, the maximum velocity being along the centerline of the flow.

The width and length of the finer are chosen so that all of the glass remains in the finer for a minimum residence time sufficient to allow the bubbles in the glass to rise to the glass' upper surface. In practice, a length/width ratio of 2/1 is preferred. Larger aspect ratios can be used, if desired, but they increase the cost of the furnace and result in greater heat losses. Aspect ratios less than 2/1, on the other hand, make it more difficult to effectively distribute the glass across the full width of the finer and to control the temperature profile along the length of the finer.

As shown in FIG. 1, molten glass (identified by arrows 21) enters finer 13 through inlet slot 23 which is in the form of a vertical channel. This slot distributes the molten glass uniformly across the back of the finer. Other approaches for introducing glass into the finer can be used. For example, the glass can be introduced through a central opening in the finer's back wall 25. Glass introduced in this way will initially start to flow rapidly down the center of the finer. Accordingly, to achieve a selected minimum residence time for the glass in the finer, the finer must be longer for the central opening approach than for the slot approach.

When an inlet slot of the type shown in FIG. 1 is used, it should have a width sufficient to receive vertical electrodes 27 and to ensure that sufficient heat will be radiated to the bottom of the slot so that glass flow can be started. In practice, a width of about one foot has been found to be sufficient. Electrodes 27 are used to ensure that the bottom of slot 23 is hot enough during start-up so that glass will start to flow out of pipe 15 and up through the slot. For many types of glasses, heating by electrodes 27 will not be necessary and thus when these glasses are being processed, the electrodes will not be energized. As shown in FIG. 1, slot 23 includes sloping sides 29. These sides help to 1) minimize heat losses, and 2) prevent stagnant glass from accumulating at the lower corners of the slot.

The operating energy for finer 13 can come from combustion, resistance heating, or from Joule heating. Generally, but not necessarily, some heating in the finer's superstructure is desirable. This heating can be by combustion or from resistance heating elements inserted through the crown. The finer shown in the figures includes burners 31 in breastwalls 33 for this purpose. These burners are used to compensate for heat losses from the breastwalls and from crown 35. Alternatively, resistance heating elements, such as moly disilicide, could be inserted through the crown. The breastwalls can also include exhaust vents 45 for removing combustion products when burners are used.

The glass flowing through finer 13 is heated by electrodes 37, e.g., molybdenum rod electrodes, inserted through side walls 39, with the electrodes on one side of the finer firing to electrodes on the other side. If desired, electrodes can also be installed through the bottom surface 19 of the finer.

The electrode locations are chosen so that the electrodes can provide sufficient power to create the desired temperature profile along the length of the finer. It is also desirable for the electrodes, to produce a uniform temperature across the width of the finer. Many electrode locations and circuit configurations known in the art can be used to achieve this result. In practice, the cross-firing approach described above has been found to work successfully. In order to monitor the temperatures within the glass as it flows through the finer, bottom surface 19 can include thermocouple blocks (not shown) for measuring the temperature of the glass at different locations along the bottom of the finer.

After flowing in a shallow layer over the finer's bottom surface, the molten glass enters exit trough 41 and flows downward until it reaches outlet pipe 43. Typically, trough 41 will have a width on the order of one foot and a depth sufficient to achieve the desired cooling of the molten glass. Preferably, the width of the trough, i.e., the distance between ledge 53 and wall 11, should be on the order of about 0.5 to about 1.5 of the depth of the glass flowing over bottom surface 19. Since the molten glass fills the trough (see, for example, FIG. 2), the ratio of the thickness of the substantially vertically-flowing molten glass in trough 41 to the depth of the substantially horizontally-flowing molten glass flowing over bottom surface 19 is also between about 0.5 and about 1.5. Of course, troughs having different dimensions can be used if desired.

As discussed above, exit trough 41 is a key feature of the present invention. This trough ensures that the fined glass is removed uniformly across the full width of the finer. In particular, the convergence of the molten glass as it exits the finer takes place in the vertical trough, rather than while the glass is over bottom surface 19. In this way, the trough preserves the relatively flat horizontal flow front of the glass right up to the end of bottom surface 19.

The trough also helps prevent scums from forming in the finer. Specifically, scums generally do not develop in the trough and, in particular, at the upper corners of the trough because the glass in the trough and, in particular, the glass in the upper corners of the trough is in motion. This motion is due to the fact that the corners of the trough are areas of high heat losses. Accordingly, the glass which flows into the corners becomes somewhat cooler than the rest of the glass in the trough and thus tends to flow downwardly into the depth of the trough at increasing speeds due to its increasing density. This downward flow keeps the glass in the corners active (i.e., not stagnant) and thus for most glasses, scums do not form. For glasses that are particularly susceptible to scumming or in situations where even a minimal amount of scumming cannot be tolerated, an overflow can be added at each corner of the trough to remove any residual scum, although in most cases such overflows will not be necessary.

Exit trough 41 also serves the important function of cooling the hot glass to a temperature suitable for passage through an exit pipe or throat. The amount of cooling can be readily controlled by simply adjusting the depth of the trough. Electrodes 47 can also be used for obtaining accurate control of the temperature of the exiting glass, as well as to ensure that the bottom of the trough is hot enough during start-up so that glass will flow into and out of the trough.

Figure 2:
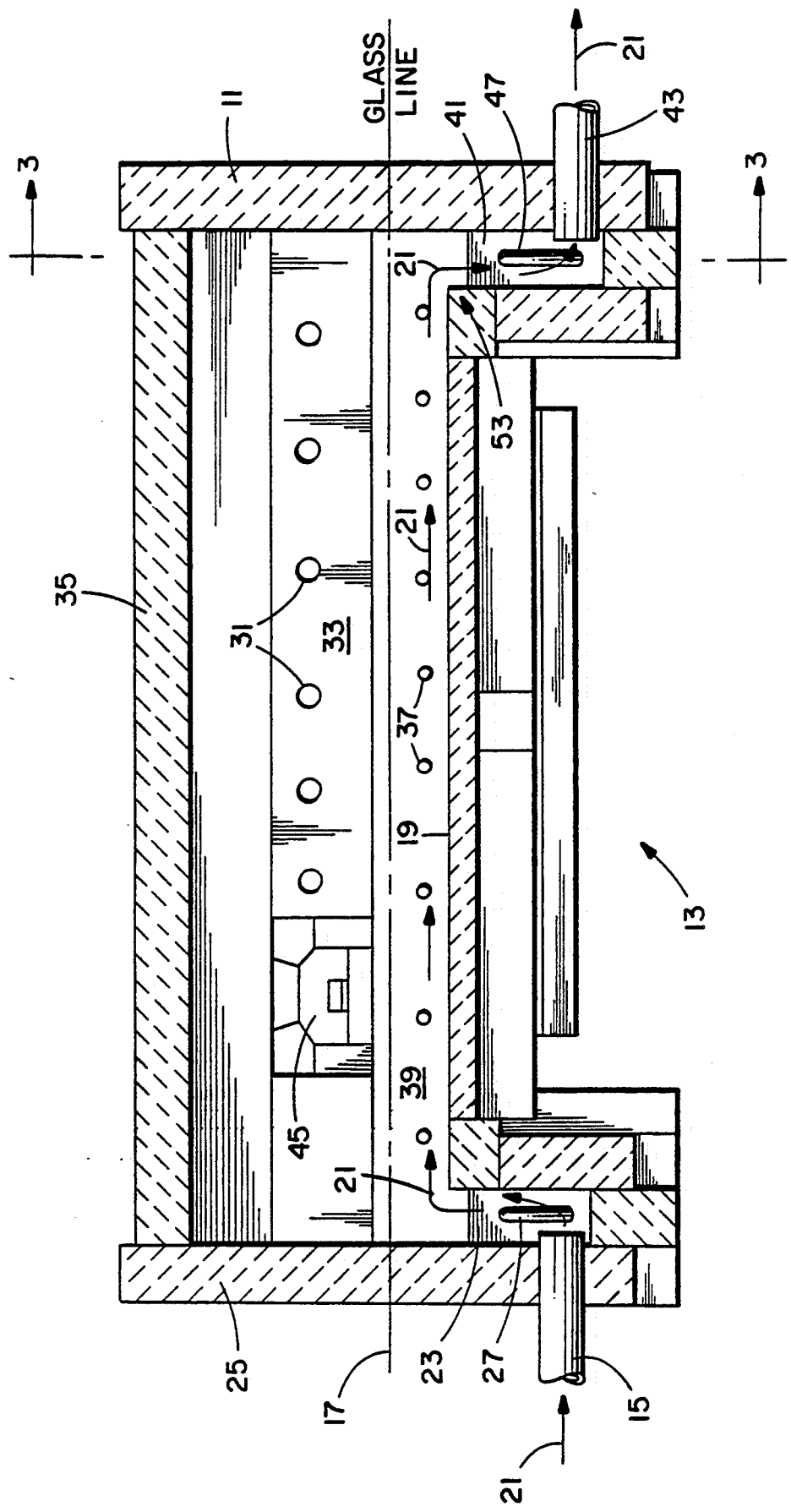
FIG. 2 is a cross-sectional view of the finer of FIG. 1 taken along lines 2—2 of FIG. 1.
Figure 3:
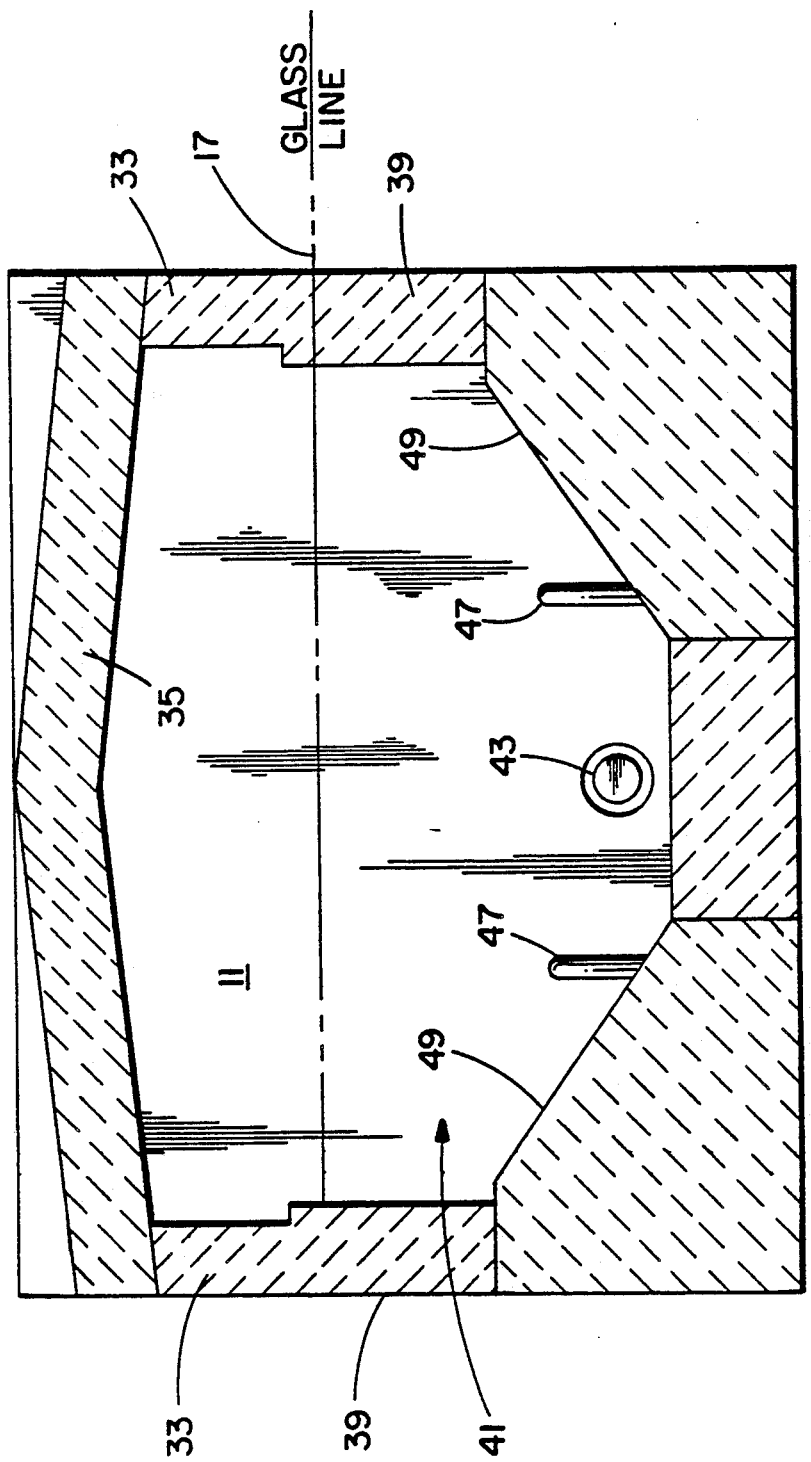
FIG. 3 is a cross-sectional view of the finer of FIG. 1 taken along lines 3—3 of FIG. 2.

As shown in FIGS. 1-3, trough 41 can include sloping sides 49 which direct the molten glass to a centrally located exit, e.g., a throat (not shown in these figures) or a pipe 43. A suitable exit pipe for use with the finer of the present invention is a molybdenum pipe. To ensure flow during start-up, the molybdenum pipe can be inductively heated in the manner disclosed in Fogle et al., U.S. Pat. No. 4,726,831.

In addition to directing the molten glass to the center of the trough, sloping sides 49 also minimize corners within the trough where off composition glass or corrosion products could collect. It should be noted that the walls of the trough need not be sloped and indeed a trough with vertical walls and a flat bottom will have more heat loss and thus can be used when more cooling of the molten glass is desired.

Figure 4:
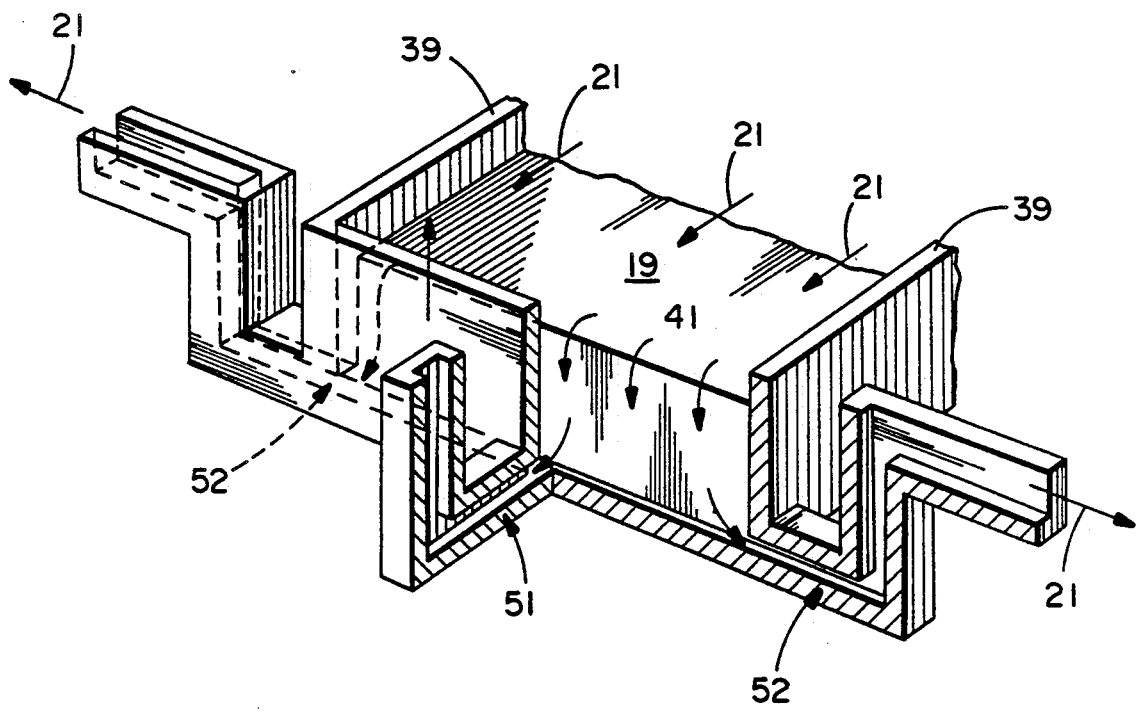
FIG. 4 is a perspective view, partially in section, showing an alternate exit trough construction having straight sides and multiple withdrawal ports at the center and edges of the trough.

FIG. 4 shows a trough which has a flat bottom and also has multiple exit throats. In particular, this trough has a central exit throat 51 and two side throats 52. In this way, the trough not only serves to cool the glass but also as a means for distributing the fined glass to multiple forming machines.

Although specific embodiments of the invention have been described and illustrated, it is to be understood that modifications can be made without departing from the invention's spirit and scope. For example, furnaces having different configurations from those shown in the figures can be used in the practice of the invention. Similarly, the principles of the invention can be used in glass processing furnaces other than finers.

What is claimed is:
1. A method for processing molten glass comprising:
   (a) introducing molten glass into a chamber;
   (b) removing bubbles from the molten glass by:
      (i) flowing the molten glass through the chamber in a substantially horizontal direction without developing substantial internal convective flows within the flowing glass; and
      (ii) heating the molten glass as it flows in the substantially horizontal direction;
   (c) cooling the molten glass while flowing the molten glass in a substantially vertical direction without mechanical agitation; and
   (d) removing the cooled molten glass from the chamber.
2. The method of claim 1 wherein the molten glass is removed from the chamber through at least one throat.
3. The method of claim 1 wherein the ratio of the thickness of the substantially vertically-flowing molten glass in step (c) to the depth of the substantially horizontally-flowing molten glass in step (b) is between about 0.5 and about 1.5.
4. The method of claim 1 wherein:
   step (c) is performed by flowing the molten glass through a vertically-oriented trough defined by a ledge and a wall, the width of the trough being the distance between the ledge and the wall; and
   the ratio of the width of the trough to the depth of the substantially horizontally-flowing molten glass in step (b) is between about 0.5 and about 1.5.
5. A method for processing molten glass comprising:
   (a) introducing molten glass into a chamber;
   (b) removing bubbles from the molten glass by:
      (i) flowing the molten glass through the chamber in a substantially horizontal direction without developing substantial internal convective flows within the flowing glass; and
      (ii) heating the molten glass as it flows in the substantially horizontal direction;
   (c) cooling the molten glass while flowing the molten glass in a substantially vertical direction; and
   (d) removing the cooled molten glass from the chamber;
   wherein the ratio of the thickness of the substantially vertically-flowing molten glass in step (c) to the depth of the substantially horizontally-flowing molten glass in step (b) is between about 0.5 and about 1.5.
6. A method for processing molten glass comprising:
   (a) introducing molten glass into a chamber;
   (b) removing bubbles from the molten glass by:
      (i) flowing the molten glass through the chamber in a substantially horizontal direction without developing substantial internal convective flows within the flowing glass; and
      (ii) heating the molten glass as it flows in the substantially horizontal direction;
   (c) cooling the molten glass while flowing the molten glass in a substantially vertical direction; and
   (d) removing the cooled molten glass from the chamber;
   wherein:
   step (c) is performed by flowing the molten glass through a vertically-oriented trough defined by a ledge and a wall, the width of the trough being the distance between the ledge and the wall; and
   the ratio of the width of the trough to the depth of the substantially horizontally-flowing molten glass in step (b) is between about 0.5 and about 1.5.

* * * * *

REEXAMINATION CERTIFICATE (1805th)

United States Patent [19]
Boettner

[11] B1 4,994,099
[45] Certificate Issued Oct. 6, 1992

[54] METHOD FOR FINING MOLTEN GLASS

[75] Inventor: George B. Boettner, Corning, N.Y.

[73] Assignee: Corning Glass Works, Corning, N.Y.

Reexamination Request:
No. 90/002,499, Nov. 4, 1991

Reexamination Certificate for:
Patent No.: 4,994,099
Issued: Feb. 19, 1991
Appl. No.: 467,251
Filed: Jan. 19, 1990

Related U.S. Application Data

[62] Division of Ser. No. 339,605, Apr. 17, 1989, Pat. No. 4,906,272.

[51] Int. Cl.$^5$ .................. C03B 5/225; C03B 5/23
[52] U.S. Cl. .................................. 65/136; 65/137

[56] References Cited
U.S. PATENT DOCUMENTS

| | | | |
|---|---|---|---|
| 4,882,736 | 11/1989 | Pieper | 373/32 |
| 4,932,035 | 6/1990 | Pieper | 373/32 |

*Primary Examiner*—Joye Woodard

[57] ABSTRACT

A furnace for fining molten glass is provided in which glass flows in a substantially vertical direction prior to exiting the furnace. As it flows vertically, the glass is allowed to cool. This cooling, in turn, allows the glass to be removed from the furnace through a narrow passageway without producing excessive wear of the passageway. Preferably, vertical flow of the molten glass at the exit end of the furnace is produced across the furnace's full width. In this way, the molten glass does not stagnate within the furnace and undesirable scums on the top surface of the glass are avoided. In certain preferred embodiments, the vertical flow is achieved by a trough which has sloped sides and which connects with and extends downward from the bottom surface of the furnace.

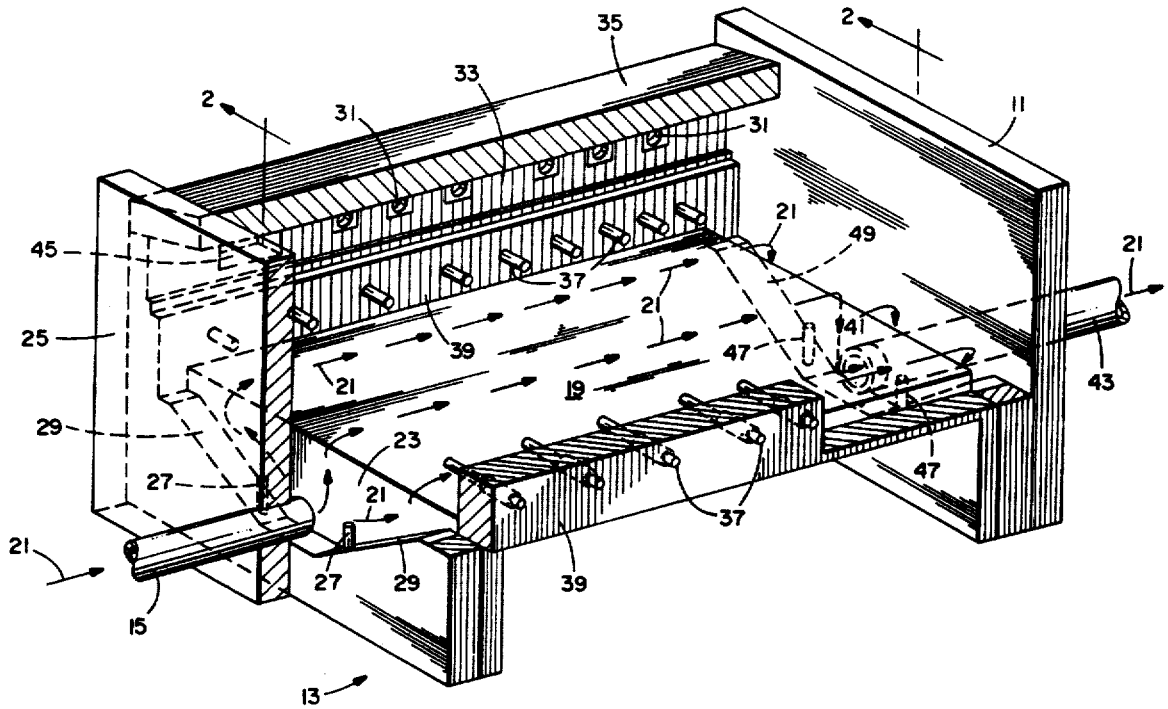

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-6 is confirmed.

* * * * *